United States Patent [19]

Schnellmann

[11] Patent Number: 4,544,277

[45] Date of Patent: Oct. 1, 1985

[54] MIXER WITH SLOTTED ROTOR AND CLEANER THEREFOR

[76] Inventor: Oscar Schnellmann, Spielwiesenstrasse 19, CH-8050 Zurich, Switzerland

[21] Appl. No.: 508,295

[22] Filed: Jun. 27, 1983

[30] Foreign Application Priority Data

Jun. 25, 1982 [CH] Switzerland ............. 3916/82

[51] Int. Cl.$^4$ ................. B28C 1/16
[52] U.S. Cl. ................. 366/78; 15/256.5;
366/98; 366/289; 366/343
[58] Field of Search ............ 366/69, 71, 78, 96–100,
366/129, 130, 241, 261, 275, 279, 289, 302–307,
315–317, 332, 333, 342, 343, 349, 605; 15/256.5

[56] References Cited

U.S. PATENT DOCUMENTS

| | | | |
|---|---|---|---|
| 2,252,076 | 8/1941 | Juterbox | 366/289 |
| 3,618,903 | 11/1971 | Ronner et al. | 366/289 |
| 3,788,609 | 1/1974 | Toczyski | 366/289 |

Primary Examiner—Timothy F. Simone
Attorney, Agent, or Firm—Griffin, Branigan & Butler

[57] ABSTRACT

A mixing apparatus for mixing material in a mixing chamber (19) is provided. A rotor (21) is mounted on a shaft (15) which is both rotated and moved axially simultaneously. Motors (13) through gears (14,16) rotate shaft (15) and rotor (21)' and hydraulic cylinders (9) move the rotor (21) axially. Motors (13), the gears (14,16), the rotor shaft (15), and the rotor (21) are all supported by carriages (11) which slide on horizontal rods (7). The rotor (21) has internal radial mixing slots (39). A rotor cleaning apparatus is provided which includes two separable collar parts (41, 41') having a plurality of cleaning prongs (43) in the form of a comb. The collar parts (41, 41') are supported by comb carriages (45, 45') which move the collar parts (41, 41') radially from a non-use position into cleaning position. When the rotor cleaning apparatus is in cleaning position, the cleaning prongs (43) are in alignment with the radial slots (39). Cleaning is effected when cleaning drive cylinders (35) move the rotor (21) into contact with the cleaning prongs (43). Wedges (53, 53') assist the alignment of radial slots (39) with the cleaning prongs (43). A positioning apparatus is affixed to the rotor shaft (15) for aligning the radial slots (39) of the rotor (21) with the cleaning prongs (43). The positioning apparatus includes a registration gear (31) which is moved by a detent element (49) projecting from a spring biased pawl (50) pivotally attached to a radially moving bar (52). When the detent (49) engages a tooth in registration gear (31), the radial slots (39) of rotor (21) are placed in alignment with the cleaning prongs (43) of the cleaning apparatus.

25 Claims, 2 Drawing Figures

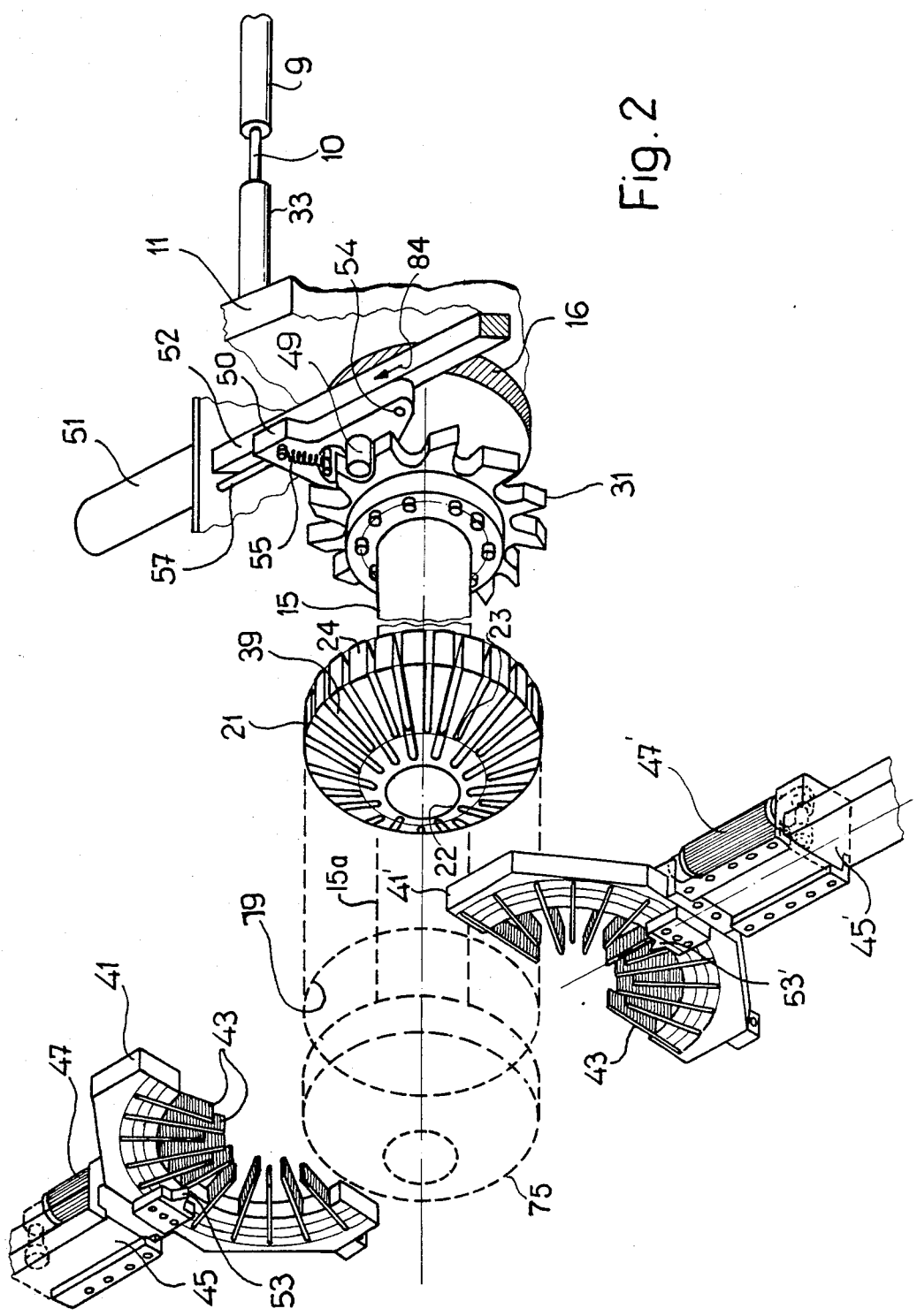

MIXER WITH SLOTTED ROTOR AND CLEANER THEREFOR

BACKGROUND OF THE INVENTION

The invention relates to mixers having closed cylindrical mixing chambers and rotors for mixing material therein. Specifically, the invention relates to a mixer having a rotor with internal passageways for the material undergoing mixing. The material is squeezed through the rotor when the rotor is both rotated and moved axially back and forth in the mixing chamber.

Mixers having rotors with internal passageways to aid in mixing have been known for more than ten years, for example U.S. Pat. No. 3,623,703 to Nielander issued Nov. 30, 1971. Such mixers have the advantage that as the simultaneous rotation and axial movement of the rotor is underway, string-like portions of the material to be mixed are continually sheared off from the mass of the material and are forceably mixed in both the radial and the axial directions. Very high shearing forces for shearing gradients are obtained. Such mixers are well suited for both mixing and plastication operations. Because the material to be mixed or plasticated is also pressed against the internal rotor surfaces defining the passageways, very high friction forces are also obtained. Such friction forces are particularly important in mixing and plastification, even on the molecular level.

Not only flowable or plastic material can be processed with such a mixer but also powdery, granular or solid materials with or without the presence of other flowable or plastic material. Regarding specific types of materials to be mixed, thermoplastic materials are plasticated to the required extent during the mixing and plasticating process. If additive materials are inorganic or non-thermoplastic materials, they are preferably reduced in size such as by grinding and dispersed to the required extent during the mixing and plasticating process. It is also possible to mix plastics, rubber, or other highly viscous or liquid materials very effectively with powdery or granular fillers, pigments, dye-stuffs and other chemical additives, e.g. raw rubber with carbon black and other additives.

In spite of the inherent advantages in the basic concept of the mixer having a rotor with internal passageways, such mixers have not become widely used because of inherent disadvantages present with prior art mixers of this type. One disadvantage is the particularly difficult problem of cleaning the internal passageways of the rotor. Prior to using the rotor for another type of material or after processing the last batch at the end of a work day, the rotor has to be cleaned.

Prior cleaning methods are cumbersome and involve cleaning one rotor passageway at a time with a hand tool. Manual cleaning requires great effort because the processed material tends to cure or vulcanize while still on rotor parts. In doing such manual cleaning work there is always the danger of the rotor getting damaged or of the worker getting injured when a tool slips. Also, in cleaning one passageway at a time, the material in the last passageway has more time to solidify or to vulcanize than the material cleaned out of the first passageway. Even if the cleaning work is relatively effortless at the beginning, it becomes more difficult with time.

Not only the rotor passageways must be cleaned but also other surfaces on the rotor and the mixing cylinder. With time, the mixed material may vulcanize on these parts as well and present difficult cleaning problems. Vulcanized material is generally less soluble in solvents than uncured material. It is thus desirable to clean the plastic material while it is still uncured. For these reasons, the worker having the task of cleaning the rotor and other associated apparatus is always under time pressure which itself increases the danger of damage or accidents.

Accordingly, it is a primary object of the present invention to provide an apparatus for cleaning a rotor having internal passageways, the apparatus providing rapid cleaning and requiring little manual work.

Another advantage of the present invention is the provision of a mechanical cleaning apparatus which cleans all rotor internal passageways simultaneously.

Another advantage of the present invention is the provision of a mechanical cleaning apparatus for the internal passageways in a rotor which does not damage the rotor.

Another advantage of the present invention is the provision of a mechanical cleaning apparatus for the internal passageways of a rotor allowing rapid cleaning of the rotor and other parts of the mixing apparatus before the processed material has time to cure.

SUMMARY OF THE INVENTION

In accordance with the purposes and principles of the present invention, a mixer apparatus is provided characterized in having a mechanical cleaning apparatus having cleaning prongs corresponding to the internal passageways of the rotor. Positioning apparatus is provided to align rotor passageways with the cleaning prongs of the cleaning apparatus. Axial drive means are provided to bring about axial movement between the rotor and the cleaning prongs.

An advantage of the present invention is that all passageways in the rotor are cleaned at the same time. At the beginning of the cleaning operation, the material to be cleaned is still plastic, and cleaning is relatively easy. Only a short time is required for cleaning, and the material in the rotor passageways does not have time to vulcanize or cure. Also, cleaning the remaining mixer parts can be done easily with conventional means such as with plasticizers or solvents because the processed materials do not have time to cure.

In a further aspect of the invention, the cleaning apparatus is comprised of at least two separable parts being separated from each other when not in use. For cleaning the rotor, the separate parts are brought together to encircle the rotor shaft. Prior to conducting the cleaning operation, the separable parts of the cleaning apparatus are located on both sides of and out of the way of the mixing cylinder; and, therefore, they do not hinder loading or unloading material into or out of the mixing cylinder.

In an additional aspect of the invention, the passageways of the rotor are in the form of radial slots, and the cleaning cleaning prongs of the cleaning apparatus are comb-like. The arrangement permits the cleaning comb to be drawn completely through the rotor slots during a cleaning operation. The comb-like arrangement of the prongs provides a solid design of the prongs so that there is little danger that a prong will break. Preferably, each comb-like part of the cleaning apparatus is located on a comb carriage movable radially toward and away from the rotor axis. The use of a carriage permits accurate positioning.

The accuracy of positioning the rotor with respect to the cleaning apparatus can be increased if on at least one part of the cleaning apparatus a wedge is provided capable of engaging a radial slot of the rotor when the rotor is moved toward the combs of the apparatus. This is done after mixing has stopped and cleaning is about to begin.

In a preferred embodiment of the invention, the positioning apparatus includes a registration gear located on the rotor shaft, the registration gearing having an arrangement of teeth corresponding to the arrangement of radial slots on the rotor. A detent member capable of being engaged with the registration gear by a detent drive member moves the rotor into the proper position in which the slots of the rotor are aligned with the prongs of the cleaning apparatus. In this way a very accurate positioning can be obtained which permits close tolerances on the rotor and comb. When the rotor and comb fit closely, a very good cleaning is obtained.

In accordance with another aspect of the invention, an auxiliary axial drive apparatus is provided to bring about back and forth axial motion between the rotor and the cleaning prongs during the cleaning operation. The auxiliary axial drive apparatus is provided in addition to the primary axial drive apparatus which moves the rotor back and forth axially at the same time the rotational drive apparatus causes the rotor to rotate during the mixing operation. The back and forth axially movement of the rotor in the mixing cylinder is accurately limited by the primary axial drive apparatus to prevent the rotor from touching either the right wall or the left lid of the mixing cylinder. The auxiliary axial drive apparatus is used only during the cleaning operation.

Preferably, both the auxiliary axial drive apparatus and the primary axial drive apparatus are hydraulic cylinders both sharing a common piston rod.

When only one axial drive apparatus is used, it is important that the travel of the rotor be limited so that the rotor does not touch either the left lid or the right wall of the mixing cylinder when axial motion is underway.

BRIEF DESCRIPTION OF THE DRAWINGS

The foregoing and other objects, features, and advantages of the invention will be apparent from the more specific description of preferred embodiments of the invention, as illustrated in the accompanying drawings in which reference characters refer to the same parts throughout the different views. The drawings are not necessarily to scale, emphasis instead being placed upon illustrating principles of the invention in a clear manner.

FIG. 2 shows a schematical perspective view of an embodiment of the cleaning apparatus of the invention.

DETAILED DESCRIPTION OF THE INVENTION

Figure 1:
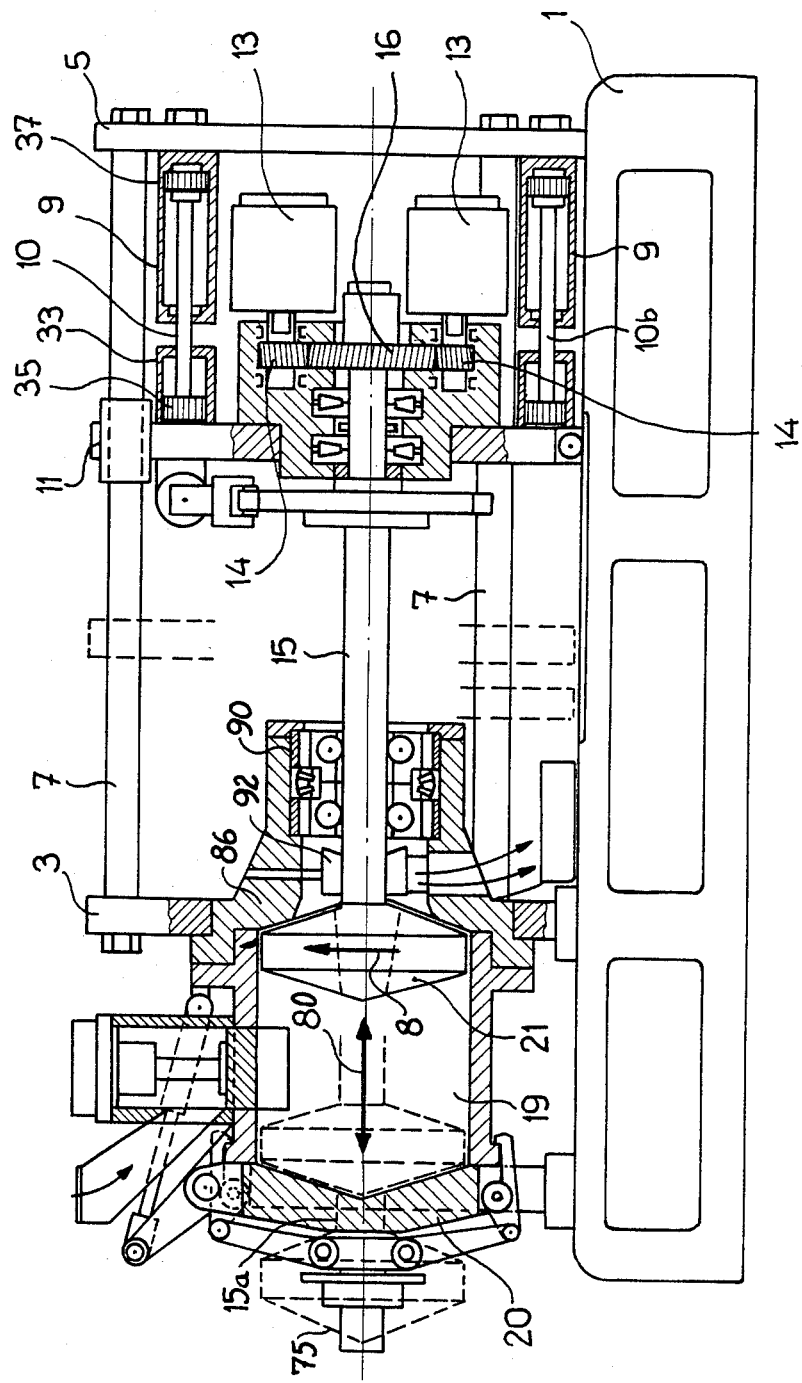
FIG. 1 shows a vertical section through an embodiment of the mixer apparatus of the invention.

In the mixer apparatus shown in FIG. 1, support plates 3 and 5 for three parallel rods 7 are provided on machine base 1. In the drawing only two rods 7 are illustrated. On rods 7 an axial carriage 11 is located. The axial carriage 11 serves as a support and guide for rotational drive apparatus in the form of motors 13 for rotating the rotor shaft 15. The axial carriage 11 is moved axially on the rods 7 by primary axial drive apparatus in the form of hydraulic cylinders 9. In this way, the rotor 21 is moved back and forth axially in a cylindrical mixing chamber 19 as indicated by arrow 80. In the embodiment shown, two parallel hydraulic cylinders 9 are used as primary axial drive apparatus for the back and forth axial movement. The pistons 37 are acting on piston rods 10.

For rotating the rotor shaft 15, two motors 13 are engaged with a gear train including gears 14 and 16 which rotatively drive the rotor shaft 15. The rotor 21 is connected to the rotor shaft 15. Preferably, the rotor 21 has internal mixing passageways in the form of radial slots 39 (see FIG. 2).

In operation, the rotor 21 is both rotated and moved back and forth axially in the cylinder chamber 19 as indicated by arrows 8 and 80 respectively. Both rotational and axial mixing motions continue until the material that is mixed has the desired properties. After opening the left lid 20, the mixed material can be pushed out of the cylinder 19 by the axial motion of the rotor 21.

Rotor shaft 15 is additionally supported by bearing assembly 90. Seal assembly 92 prevents the contents of mixing chamber 19 from leaking onto shaft 15. Right wall 86 of mixing chamber 19 has an axial hole for the shaft 15 to pass through.

In FIG. 2, an embodiment of the cleaning apparatus of the invention is shown. The rotor 21 and the drive gear 16 are both connected to the rotor shaft 15. For purposes of representation of FIG. 2, the rotor shaft 15 is not drawn to scale and is shown shorter than in reality. An axial motion of the rotor 21 is provided by the hydraulic cylinders 9 and 33 acting on the carriage 11 on which the rotor shaft 15 and the motors 13 (in FIG. 1) are supported. Whereas in FIG. 1 two pairs of cylinders 9 and 33 are shown, only one pair of the cylinders 9 and 33 is shown in FIG. 2.

The rotor 21 includes a rotor body 23 and an axial hole 22 for connecting the rotor 21 to the shaft 15. The rotor body 23 is comprised of a plurality of solid, radially projecting mixing blades 24 having radial slots 39 therebetween.

In the embodiment shown in FIGS. 1 and 2, the cylinders 9 and 33 act on a common piston rod 10. During the mixing and plasticating operation, the piston 35 (FIG. 1) of the cylinder 33 is in the position shown in FIG. 1. With hydraulic fluid acting on one or the other side of the piston 37, this piston is moved back and forth axially in the cylinder 9; and as a result the rotor 21 is moved from one end of the mixing chamber 19 to the other end axially in the directions shown by arrow 80. If the plasticated material is to be ejected from the mixing chamber 19, the left lid 20 is opened; and, by suitable operation of the piston 37 and the cylinders 9, the rotor 21 is brought into the position shown with dotted lines 79 in FIG. 1. If the rotor 21 is to be cleaned, hydraulic cylinder 33 is operated so that an additional motion of the carriage 11 takes place to bring the rotor 21 into the position outside of the cylinder chamber 19 as shown with dotted lines 75 in FIGS. 1 and 2.

As shown in FIG. 2, the internal passageways of rotor 21 are in the form of radial slots 39. To clean these slots 39, cleaning apparatus is provided having two collar parts 41 and 41' with prongs 43 corresponding to the slots 39. In the non-use position, the collar parts 41 and 41' are separated from each other. For conducting the cleaning operation, rotor 21 is first moved to position 75 which is to the left of the plane in which collar parts 41 and 41' lie. For cleaning the rotor 21, collar parts 41 and 41' are driven radially into a position to the right of rotor 21 in which they surround the rotor shaft 15 shown in dotted outline as 15a. Hydraulic cylinder 33 is now operated to move the rotor shaft 15 in the direction of the mixing chamber 19, and the prongs 43 engage the slots 39 and clean out the material contained therein. The axial motion may be repeated back and forth in the direction of arrow 80 as many times as desired. After cleaning, the rotor 21 can again be withdrawn into the mixing chamber 19 by the hydraulic cylinder 9; and the collar parts 41 and 41' are driven radially into the non-use position. After cleaning, lid 20 is resecured to seal mixing chamber 19, and a new charge of material may be added through hopper 78 and feeding ram 82 shown in FIG. 1.

To permit exact positioning of the collar parts 41 and 41', they are supported on comb carriages 45 and 45'. Hydraulic or pneumatic comb carriage driving cylinders 47 and 47' provide the necessary movement of the comb carriages 45 and 45' to bring the collar parts 41 and 41' into position.

It is possible to obtain an alignment between rotor 21 and combs 43 by manually setting combs 43 in alignment with slots 39.

However, it is of considerable advantage if a mechanical positioning apparatus is provided to align the rotor 21 and the combs 43 so that the prongs 43 correspond to the slots 39. The preferred positioning apparatus is comprised of a registration gear 31 and a detent member 49 capable of acting on the registration gear 31 to provide a small rotation of the rotor shaft 15. A hydraulic or pneumatic detent drive cylinder 51 is provided to drive detent member 49. In the embodiment shown in FIG. 2, a bar 52 capable of being moved back and forth by cylinder 51 in the direction of arrow 84 carries a pawl 50. Detent member 49 projects from pawl 50 to engage registration gear 31. The pawl 50 is pivotably mounted on a pivot 54 of the bar 52; and a spring 55 biases the pawl 50 toward the position shown. The radial movement of the bar 52 with the detent member 49 is limited by the stop 57 in the direction of detent drive cylinder 51.

During the mixing operation, the rotor shaft 15 rotates normally; and the detent member 49 does not engage the registration gear 31. In the non-use position, pawl 50 and detent 49 are in their farthest position away from stop 57. However, when mixing is stopped and the rotor is positioned for cleaning at location 75, the detent drive cylinder 51 cause a movement of the bar in direction of the arrow 84. The detent member 49 engages a tooth of the registration gear 31 and moves it until the pawl 50 abuts the stop 57. The comb carriage driving cylinders 47 and 47' bring alignment wedges 53 and 53' into engagement with the radial slots 39 of the rotor 21. The rotor 21 is now positioned, and the drive cylinder 51 moves the bar 52 into the rest position in which the detent member 49 no longer engages the registration gear 31.

While the embodiment of the invention shown in FIG. 2 depicts collar parts 41 and 41' with prongs 43 in the form of combs to engages passageways in the form of radial slots 39, it is possible to form the passageways 39 differently. For example, passageways 39 may take the form of cylindrical bores. Accordingly, rather than prongs 43 a stamp would have to be provided having cylindrical pins for fitting the bores. Such a design would require that after moving the cleaning pins into the rotor, they would have to be withdrawn before the rotor 21 could be moved back into the mixing chamber 19. This is in contrast to the use of the prongs 43 whereby when the prongs 43 have passed through the radial slots 39 in one direction, it is not absolutely necessary that they pass through the radial slots 39 going in the opposite direction.

The foregoing description of the novel mixing and cleaning apparatus of the invention has been presented for purposes of illustration and description. It is not intended to be exhaustive or to limit the invention to the precise forms disclosed. Obvious modifications or variations are possible in light of the above teachings. The embodiments were chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

The embodiments of the invention in which an exclusive property or privilege is claimed are defined by the following:

1. A mixing apparatus for mixing material in a closed mixing chamber, comprising:
    a rotor mounted on a shaft, said rotor and shaft rotated by rotating driving means and moved axially by primary axial drive means, said rotor having internal passageways for passing the material being mixed therethrough;
    cleaning means normally located outside the mixing chamber and having cleaning fingers corresponding to said rotor passageways; and
    positioning means for aligning said rotor passageways with said cleaning fingers afer a mixing operation.

2. A mixing apparatus as described in claim 1, further comprising:
    auxiliary axial drive means for providing axial motion for cleaning the rotor.

3. A mixing apparatus for mixing material in a mixing chamber, comprising:
    a rotor mounted on a shaft, said rotor and shaft rotated by rotating driving means and moved axially by primary axial drive means, said rotor having internal passageways for passing the material being mixed therethrough;
    cleaning means having cleaning fingers corresponding to said rotor passageways;
    positioning means for aligning said rotor passageways with said cleaning fingers; and
    auxiliary axial drive means for providing axial motion for cleaning the rotor,
    wherein said auxiliary axial drive means is a hydraulic cylinder and piston, wherein said primary axial drive means is a hydraulic piston and cylinder, and wherein a common piston is shared by both said auxiliary axial drive means and said primary axial drive means.

4. A mixing apparatus as described in claims 1, 2, or 3, wherein said rotor passageways are radial slots.

5. A mixing apparatus as described in claims 1, 2, or 3, wherein said cleaning fingers are comb-like prongs.

6. A mixing apparatus as described in claim 3, wherein said cleaning means is comprised of two separable collar parts, separated from each other when not in use, and brought into a cleaning position in which they encircle said rotor shaft.

7. A mixing apparatus as described in claim 6, wherein said separated collar parts are supported by carriages and are moved together radially by collar part carriage driving means.

8. A mixing apparatus as described in claim 7, wherein at least one of said collar parts is provided with a wedge for engaging a radial passageway of said rotor when said collar parts have been moved toward said rotor shaft into the cleaning position.

9. A mixing apparatus for mixing material in a mixing chamber, comprising:
   a rotor mounted on a shaft, said rotor and shaft rotated by rotating driving means and moved axially by primary axial drive means, said rotor having internal passageways for passing the material being mixed therethrough;
   cleaning means having cleaning fingers corresponding to said rotor passageways; and
   positioning means for aligning said rotor passageways with said cleaning fingers;
   wherein said positioning means is comprised of:
      a registration gear located on said rotor shaft, said registration gear having an arrangement of teeth corresponding to the arrangement of rotor passageways;
      a detent member capable of being engaged with said registration gear; and
      a detent drive means for moving said detent member into engagement with said registration gear, whereby said rotor passageways are aligned with said cleaning fingers.

10. A mixing apparatus as described in claim 9, wherein said detent member is located on a pawl pivotally mounted on a rod capable of being driven back and forth by a rod drive means.

11. A mixing apparatus as described in claims 9 or 10, wherein said positioning means includes a stop means for limiting the motion of said pawl.

12. For a closed mixing apparatus having a rotor shaft with a mixing rotor with internal mixing passageways, a cleaning apparatus, comprising:
   a plurality of cleaning fingers normally located outside the mixing chamber; and
   a collar for supporting said cleaning fingers and for aligning said cleaning fingers with the rotor passageways after a mixing operation.

13. For a mixing apparatus having a rotor shaft with a mixing rotor with internal mixing passageways, a cleaning apparatus, comprising:
   a plurality of cleaning fingers; and
   a collar for supporting said cleaning fingers and for aligning said cleaning fingers with the rotor passageways, wherein said collar is comprised of two collar parts, said collar parts being separated from each other when mixing is underway, said collar parts brought into position in which they encircle the rotor shaft in the cleaning position.

14. A cleaning apparatus as described in claim 13, wherein said collar parts are located on carriages which move radially toward the rotor shaft thereby causing said collar parts to encircle the rotor shaft when said collar parts are in the cleaning position.

15. A cleaning apparatus as described in claims 13 or 14, wherein at least one of said collar parts is provided with a wedge for engaging a rotor passageway when said collar parts are in the cleaning position encircling the rotor shaft.

16. A rotary mixing and cleaning apparatus, comprising:
   a rotor with internal mixing passageways, said rotor rotating on an axis, said rotor located inside a mixing chamber during mixing; and
   a cleaning apparatus normally located outside the mixing chamber comprised of a plurality of cleaning fingers, said cleaning fingers being aligned with said rotor passageways, said rotor moved axially against said cleaning fingers for cleaning out said passageways of said rotor after a mixing operation.

17. A rotor mixing and cleaning apparatus, comprising:
   a rotor with internal mixing passageways, said rotor rotating on an axis; and
   a cleaning apparatus comprised of a plurality of cleaning fingers, said cleaning fingers being aligned with said rotor passageways, said rotor moved axially against said cleaning fingers for cleaning out said passageways of said rotor, wherein said plurality of cleaning fingers are affixed to two collar parts, said collar parts being separated from each other in a rest position when not in use, said collar parts brought together to encircle the rotor shaft when used for cleaning said rotor.

18. A rotary mixing and cleaning apparatus as described in claim 17, wherein said collar parts are located on carriages for moving said collar parts radially to encircle the rotor shaft.

19. A rotary mixing and cleaning apparatus as described in claims 17 or 18, wherein at least one of said collar parts has a wedge for engaging a rotor passageway when said collar parts are moved into the cleaning position encircling the rotor shaft.

20. An alignment apparatus for positioning a shaft mounted rotor having internal mixing passageways in alignment with cleaning elements of an apparatus for cleaning the passageways, comprising:
   a registration gear located on the rotor shaft, the teeth of said registration gear corresponding to the arrangement of the passageways in the rotor;
   a detent member capable of being engaged with said registration gear; and
   a drive member for moving said detent member into engagement with said registration gear, whereby the rotor passageways are positioned in alignment with the cleaning elements of the cleaning apparatus.

21. An apparatus for positioning a rotor as described in claim 20, wherein said detent member is located on a pawl pivotally mounted on a rod capable of being driven back and forth by drive means.

22. An apparatus for positioning a rotor as described in claim 21, wherein said pawl is movable by pawl drive means up to a stop means.

23. A mixing apparatus as described in claim 1 wherein said cleaning means is comprised of two separable collar parts, separated from each other when not in use, and brought into a cleaning position in which they encircle said rotor shaft.

24. A mixing apparatus as described in claim 23, wherein said separated collar parts are supported by carriages and are moved together radially by collar part carriage driving means.

25. A mixing apparatus as described in claim 24, wherein at least one of said collar parts is provided with a wedge for engaging a radial passageway of said rotor when said collar parts have been moved towards said rotor shaft into the cleaning position.

* * * * *